(12) United States Patent
Uehara

(10) Patent No.: US 7,955,007 B2
(45) Date of Patent: Jun. 7, 2011

(54) LENS BARREL WITH BARRIER DEVICE

(75) Inventor: Takumi Uehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 12/427,597

(22) Filed: Apr. 21, 2009

(65) Prior Publication Data

US 2009/0268320 A1 Oct. 29, 2009

(30) Foreign Application Priority Data

Apr. 24, 2008 (JP) .................................. 2008-113865

(51) Int. Cl.
*G03B 17/00* (2006.01)
(52) U.S. Cl. ........................................................ 396/448
(58) Field of Classification Search .................... 396/448
See application file for complete search history.

(56) References Cited

U.S. PATENT DOCUMENTS

| 6,264,380 | B1 | 7/2001 | Omiya | |
|---|---|---|---|---|
| 2003/0049031 | A1* | 3/2003 | Nagae | 396/448 |
| 2006/0098975 | A1* | 5/2006 | Kobayashi | 396/448 |
| 2008/0025719 | A1* | 1/2008 | Uehara | 396/448 |

FOREIGN PATENT DOCUMENTS

| JP | 7-159856 A | 6/1995 |
|---|---|---|
| JP | 7-191380 A | 7/1995 |

* cited by examiner

*Primary Examiner* — W. B. Perkey
(74) *Attorney, Agent, or Firm* — Canon USA, Inc. IP Division

(57) ABSTRACT

A lens barrel includes a barrel member including an optical system and a barrier device mounted thereto. The barrier device includes blades that are openable/closable to protect a front surface of the optical system, a cover member having an opening portion for allowing light to pass therethrough, and a barrier driving member configured to drive the barrier blades such that the blades are revolvable around an optical axis. Size of shielded area is defined when the blades are fitted together after rotating corresponding to a range capable of shielding the opening portion. Rotation shafts are configured to allow the blades to rotate therearound to be opened/closed and are pivotally mounted on the barrier driving member. The barrier driving member is configured to rotate to bring the blades into a closed state in such a manner as to shield a gap made between the shielded area and the opening portion.

9 Claims, 7 Drawing Sheets

LENS BARREL WITH BARRIER DEVICE

BACKGROUND OF THE INVENTION

1. Field of the Invention

The present invention relates to a lens barrel with a barrier device, and more particularly to a lens barrel equipped with a barrier device mounted in front of a photographic lens in an openable and closable manner to protect the photographic lens.

2. Description of the Related Art

In general, some lens barrels mounted on optical apparatuses, such as cameras, are provided with a barrier device, in which barrier blades configured to protect the front surface of an optical system (lens) are openable and closable in conjunction with an advancing and retracting operation of a lens barrel frame.

A conventional barrier device is configured such that a plurality of barrier blades are pivotally mounted on a lens barrel member, which holds a lens. The barrier blades are driven to be openable and closable by a barrier driving ring, which is rotatable around an optical axis.

In the barrier device, a barrier closing spring is mounted in a tensioned state between the barrier blade and the barrier driving ring to urge the barrier blade in a closing direction to cause the barrier blades to always contact the barrier driving ring, thus absorbing a relief movement of the barrier driving ring relative to the barrier blades.

Further, in the barrier device, a barrier opening spring is mounted in a tensioned state between the barrier driving ring and the lens barrel cover to urge the barrier driving ring, thereby driving the barrier blades in an opening direction.

The barrier device is further configured such that a rotational force of a rotating barrel is transmitted to the barrier driving ring via a connection shaft, as discussed in Japanese Patent Application Laid-Open No. 7-159856.

In the barrier device configured in the above-described manner, the rotating barrel rotates in a clockwise direction to transmit a rotational force of the rotating barrel to the barrier driving ring via the connection shaft.

The barrier driving ring, to which the rotational force has been transmitted, rotates in the clockwise direction, while charging the barrier opening spring, and the barrier blades follow the rotation of barrier driving ring by an urging force of the barrier closing spring, thus rotating in a counterclockwise direction. This rotation causes the barrier blades to shift to a state of covering the front surface of the lens.

In the barrier device, the rotation of the rotating barrel in the counterclockwise direction causes a contact portion between the rotating barrel and the connection shaft to be free. The barrier driving ring then rotates in the counterclockwise direction by an urging force of the barrier opening spring being charged, and the barrier blades follow the rotation of the barrier driving ring to be rotated in the clockwise direction. This rotation causes the barrier blades to shift to a state of opening the front surface of the lens.

The barrier blades, which are in a fully open state, contact stoppers, so that a rotation thereof in the clockwise direction is restricted. Accordingly, the rotation of the barrier driving ring is stopped.

When a rotation of the barrier blades in the closing direction is disabled by some obstacles (e.g., foreign substance such as sand) in the process of a closing operation, the barrier closing spring is charged by a rotation of the barrier driving ring in the clockwise direction, so that the rotation of the barrier driving ring in the clockwise direction is enabled.

Thus, in the barrier device, the barrier closing spring acts as a member that allows a relief movement of the barrier driving ring relative to the barrier blades, which prevents mechanical breakdown from occurring.

There is a strong demand for reductions in size of cameras on which a lens barrel with a barrier device as described above is mounted. To achieve the reduction in size of the lens barrel with a barrier device, it is effective to decrease a diameter of the lens barrel equipped with a barrier device by decreasing a retraction space of the barrier blades for retraction with a good efficiency.

Thus, conventionally, in a lens barrel equipped with a barrier device for opening and closing a photographing opening portion formed in substantially rectangular shape, a method for decreasing a diameter of the lens barrel is discussed (see Japanese Patent Application Laid-Open No. 7-191380). In the method for decreasing a diameter of the conventional lens barrel, the lens barrel is configured to enhance a space efficiency of the barrier blades with respect to the size of the photographing opening portion by setting an optimum shape of the barrier blades and a retraction position thereof with respect to the photographing opening portion.

In the barrier device discussed in Japanese Patent Application Laid-Open No. 7-191380, a rotation shaft of the barrier blade is mounted on a barrier driving ring, which rotates around an optical axis, and a follower provided at a tip of the barrier blade is caused to engage with a cam groove provided on a cover member. In the barrier device configured in this manner, when the barrier driving ring is rotated, the rotation shaft of the barrier blade performs a rotational movement around the optical axis, and at the same time, the tip of the barrier blade moves along a path defined by the cam groove. Consequently, in the barrier device, the position and orientation of the barrier blades when the barrier blades are opened can be adjusted by changing the amount of rotation of the barrier driving ring and the path defined by the cam groove. Thus, a retraction space of the barrier blades when the barrier blades are opened can be optimized.

However, in the lens barrel with a barrier device, when a configuration is employed in which barrier blades are pivotally mounted on a lens barrel member, a retraction space when the barrier blades are opened is fixedly determined. Accordingly, in this case, there is no room for designing the lens barrel to be reduced in size by decreasing a retraction space when the barrier blades are opened. Thus, it is difficult to attain the reduction in size of the lens barrel.

In addition, in the lens barrel with a barrier device, the barrier blades may fail to rotate in a closing direction due to some obstacles (e.g., foreign substance such as sand) during the closing operation. In order to deal with the problem, in the configuration where the barrier blades are pivotally mounted on the lens barrel member, dedicated parts (barrier closing spring) need to be provided in the lens barrel for absorbing a relief movement of the barrier driving ring relative to the barrier blades when the barrier blades fail to perform the closing operation. Accordingly, it is difficult to achieve a reduction in the size of the lens barrel.

Further, in the lens barrel with a barrier device that is configured such that the rotation shaft of the barrier blade rotates around the optical axis, the tip of the barrier blade is configured to slide within the cam groove during the opening and closing operation of the barrier blades. For this reason, the barrier blades cannot move in a closing direction during the closing operation if there are obstacles (e.g., foreign substance such as sand) between the tip of the barrier blade and the cam groove. When a movement of the barrier blades is blocked, the barrier driving ring is also blocked from rotating in the closing direction. For this reason, the barrier driving ring may become unable to rotate in the closing direction, so that the lens barrel may not be retracted.

SUMMARY OF THE INVENTION

The present invention is directed to a lens barrel equipped with a barrier device, which enables the size of a lens barrel to be reduced and allows a stable opening and closing operation.

According to an aspect of the present invention, a lens barrel includes a lens barrel member including an optical system, and a barrier device mounted on the lens barrel member, the barrier device including a plurality of barrier blades that are openable and closable to protect a front surface of the optical system, a cover member mounted on the lens barrel member and having an opening portion for allowing light to pass therethrough, and a barrier driving member mounted on the lens barrel member and configured to drive the plurality of barrier blades such that the plurality of barrier blades are revolvable around an optical axis, wherein a size of a shielded area defined when the plurality of barrier blades are fitted together after rotating corresponds to a range capable of shielding the opening portion, wherein rotation shafts configured to allow the plurality of barrier blades to rotate therearound to be opened and closed are pivotally mounted on the barrier driving member, and wherein the barrier driving member is configured to rotate to bring the plurality of barrier blades into a closed state in such a manner as to shield a gap made between the shielded area and the opening portion.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
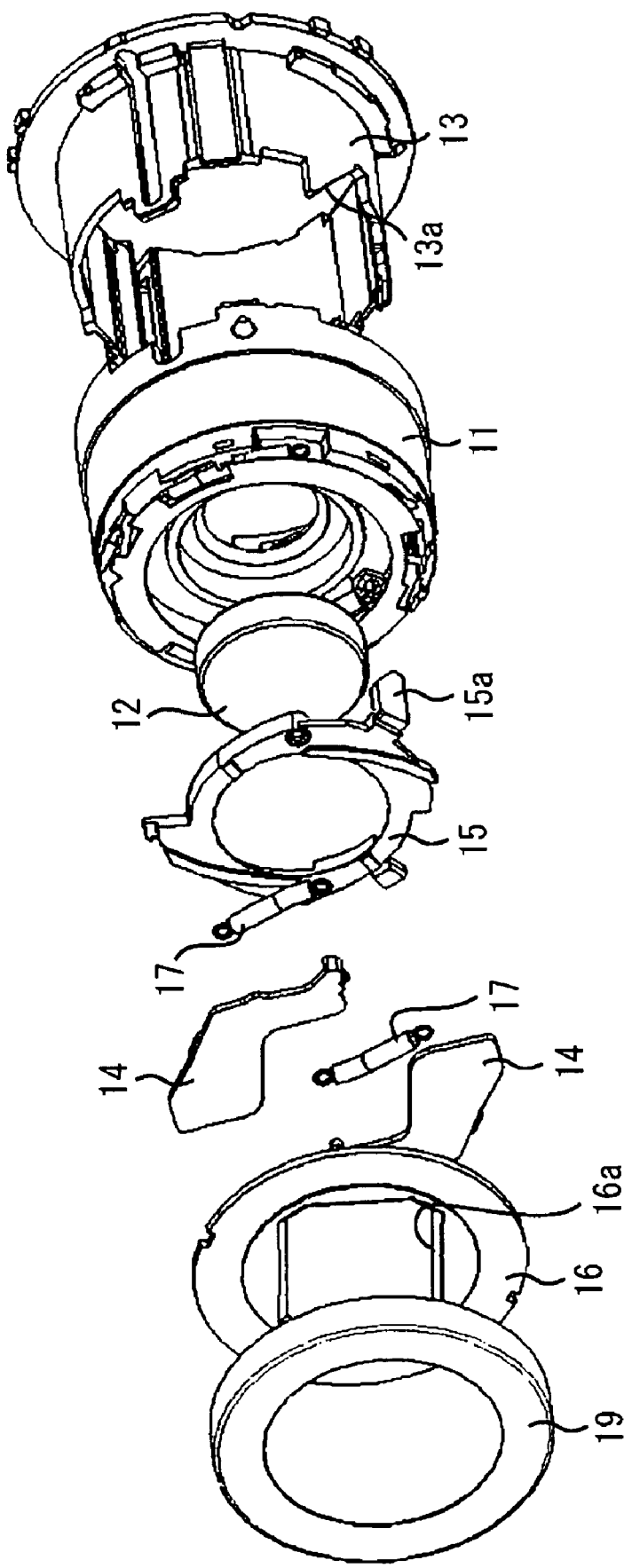
FIG. 1 is an exploded perspective view of a lens barrel with a barrier device according to an exemplary embodiment of the present invention.

FIG. 1 is an exploded perspective view of a lens barrel with a barrier device according to an exemplary embodiment of the present invention.

In FIG. 1, a lens barrel member 11 holds a photographic lens 12 and is configured to perform retracting and outwardly extending operations along an optical axis direction in response to an operation by a photographer. A rectilinear motion tube 13 for restricting a rotation of the lens barrel member 11 is arranged inside the lens barrel member 11. The lens barrel member 11 and the rectilinear motion tube 13 can move relative to each other in the optical axis direction. The distance between the lens barrel member 11 and the rectilinear motion tube 13 becomes wide in a photographing state and narrow in a retracting state.

A barrier device is arranged at an end side of the lens barrel member 11. The barrier device includes a pair of barrier blades 14, a barrier driving member 15 for holding and driving the barrier blades 14 to be opened and closed, and a barrier cover 16, in which a photographing opening portion 16a is formed. A decorative plate 19 for hiding a holding portion and a positioning portion of the barrier cover 16 is placed on the front surface of the barrier cover 16 (cover member), which is placed within the lens barrel member 11.

The photographing opening portion 16a is formed in a substantially rectangular shape (non-circular shape, here, an elongate rectangular shape as viewed in the figure with each corner being formed in an oblique edge), which allows photographing light to pass (transmit) therethrough.

The pair of barrier blades 14, which are arranged adjacent to the photographing opening portion 16a, are mounted to shield the photographing opening portion 16a during a retraction of the lens barrel member 11, and to fully open during a photographing state where the lens barrel member 11 is outwardly extended.

On the lens barrel member 11, the barrier driving member 15 is rotatably mounted. In the barrier driving member 15, the barrier blades 14 are pivotally supported by the rotation shafts 14a provided at base ends of the barrier blades 14.

Hook-shaped portions 14c are formed at the base ends of the barrier blades 14. The hook-shaped portions 14c extends out to the lens barrel member side to hook on operation projection portions 11c of the lens barrel member 11 for performing an opening operation of the barrier blades 14. Thus, in the barrier device, the operation projection portions 11c are arranged at the lens barrel member 11 in such a manner as to be able to contact the hook-shaped portions 14c.

Between the lens barrel member 11 and the barrier blades 14, barrier driving springs 17 (e.g., extension coil spring) are provided. Thus, the barrier blades 14 are configured to be urged in the counterclockwise direction around the rotation shafts 14a (in the direction of arrow A), in a normal state in which the hook-shaped portions 14c are not pressingly contacting the operation projection portions 11c of the lens barrel member 11.

In the barrier device, a positional relationship in a radial direction relative to the optical axis is set such that the rotation shaft 14a of the barrier blade 14, the spring hooked portion 14b, and the hook-shaped portion 14c are aligned in the order of shortest distance first from the optical axis.

In the barrier device, a cam face 13a is provided in the rectilinear motion tube 13 corresponding to a cam face 15a formed on the barrier driving member 15, as a driving member for rotating the barrier driving member 15 to cause the pair of barrier blades 14 to perform open/close operation.

In the present specification, a phase of the barrier driving member 15 when the barrier blades 14 open is referred to as "barrier open phase", and a phase of the barrier driving member 15 when the lens barrel member 11 retracts and the barrier blades 14 close is referred to as "barrier closed phase".

In the barrier device, following a retracting operation of the lens barrel member 11, the cam face 15a and the cam face 13a contact each other, which forcibly rotate the barrier driving member 15 in the clockwise direction (in the direction of arrow B) to the "barrier closed phase", thus closing the barrier blades 14. Thus, in the barrier device, a driving unit drives and rotates the barrier driving member 15 from the position of the barrier open phase to the position of the barrier closed phase. The barrier driving springs 17 are charged by a clockwise operation (in the direction of arrow B) of the barrier driving member 15.

In the barrier device, following an operation to outwardly extend the lens barrel 11, the cam face 15a and the cam face 13a, which have been in contact with each other, are separated, and the barrier driving member 15 rotates in the counterclockwise direction to the barrier open phase, thus opening the barrier blades 14. This operation is performed upon receiving an urging force when a charge of the barrier driving springs 17 is released.

In the barrier device, when causing the lens barrel member 11 to retract while restraining the opened barrier blades 14 from closing in a state where the lens barrel 11 is outwardly extended, the barrier driving member 15 rotates to the barrier closed phase. According to the operation, the barrier driving springs 17 are charged.

When a restraint of the barrier blades 14 is removed from this state, the barrier blades 14 close while a charge of the barrier driving springs 17 is released.

In the barrier device, if the barrier blades 14 are forcibly opened during a retraction, the barrier blades 14 open while charging the barrier driving springs 17. If a forced opening of the barrier blades 14 is released, the barrier blades 14 operate to close while releasing a charge of the barrier driving springs 17.

Next, open/close operation of the barrier device and conditions with respect to the amount of charge of the barrier driving springs 17 will be described in detail with reference to FIG. 2 to FIG. 6. In FIG. 2 to FIG. 6, descriptions of the lens 12, the rectilinear motion tube 13, the barrier cover 16, the decorative plate 19, and shapes of portions that have no direct relationship with the present invention are omitted.

Figure 2:
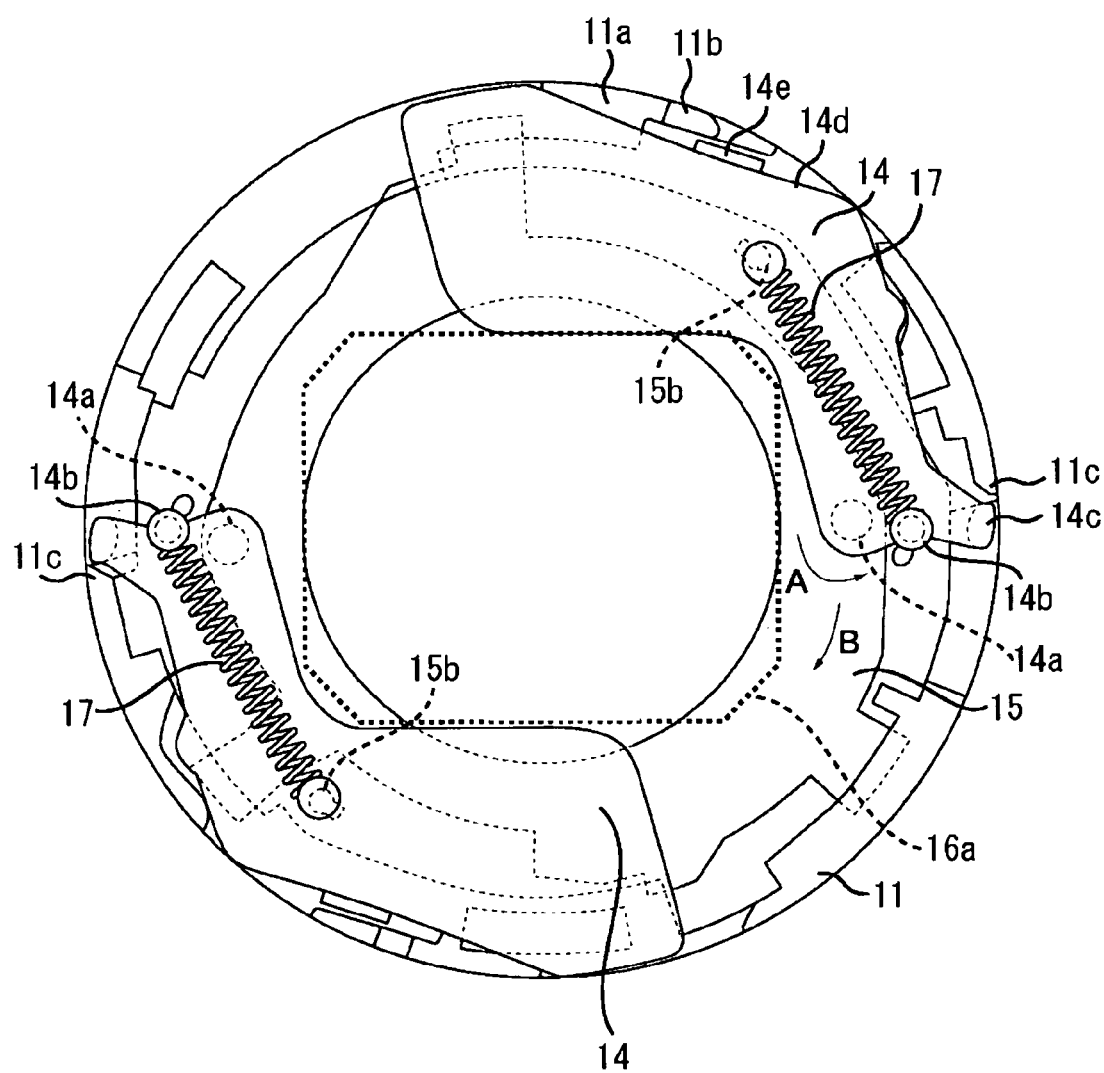
FIG. 2 is a front elevational view illustrating a state where a lens barrel member is extended outwardly and barrier blades are fully opened in the lens barrel with the barrier device according to an exemplary embodiment of the present invention.

FIG. 2 is an elevational view illustrating a state in which a lens barrel member 11 has outwardly extended and the barrier blades 14 have fully opened (hereinafter referred to as an open state) in a lens barrel with barrier device according to an exemplary embodiment of the present invention. In the open state, the cam face 15a (as illustrated in FIG. 1) of the barrier driving member 15 and the cam face 13a (as illustrated in FIG. 1) of the rectilinear motion tube 13 are completely separated. Accordingly, the barrier driving member 15 is in a freely rotatable state with no limitations on an operation in a rotational direction.

As illustrated in FIG. 2, the barrier blades 14 are pivotally mounted by the rotation shafts 14a, which are located closest to the optical axis. Further, the barrier blades 14 receive a tension of the barrier driving springs 17, which are attached at one ends thereof to the spring hooked portions 14b, which are located farther from the optical axis than the rotation shafts 14a.

In the barrier device, the spring hooked portions 14b are arranged at intermediate positions between the rotation shafts 14a and the hook-shaped portions 14c at the base end portions of the barrier blades 14.

Between the spring hooked portions 14b and the spring hooked portions 15b of the lens barrel member 11, the barrier driving springs 17 are provided to urge the barrier blades 14 in a direction to cause the spring hooked portions 14b to approach the operation projection portions 11c. Consequently, the spring hooked portions 15b of the lens barrel member 11 are arranged at free end portion sides of the barrier blades 14 relative to the barrier blades 14.

In a state illustrated in FIG. 2, the hook-shaped portions 14c for the barrier blades 14 are pressed to contact the operation projection portions 11c by an urging force in a direction to cause the spring hooked portions 14b for the barrier driving springs 17 to approach the operation projection portions 11c. Therefore, the barrier blades 14 are in a state of being urged by the barrier driving springs 17 such that the barrier blades 14 rotate around the hook-shaped portions 14c in a direction to cause the free end portions thereof to move away from the optical axis.

In addition, end faces 14d of the barrier blades 14 are pressed tightly against open stoppers 11a provided in the lens barrel member 11, so that the barrier blades 14 receive an urging force of the barrier driving springs 17. As a result, the barrier blades 14 remains stationary, thus maintaining a fully opened state.

The barrier device is configured such that the length of the barrier driving springs 17 becomes shortest in the barrier open state. Accordingly, the amount of charge of the barrier driving springs 17 becomes smallest in the barrier open state.

Figure 5:
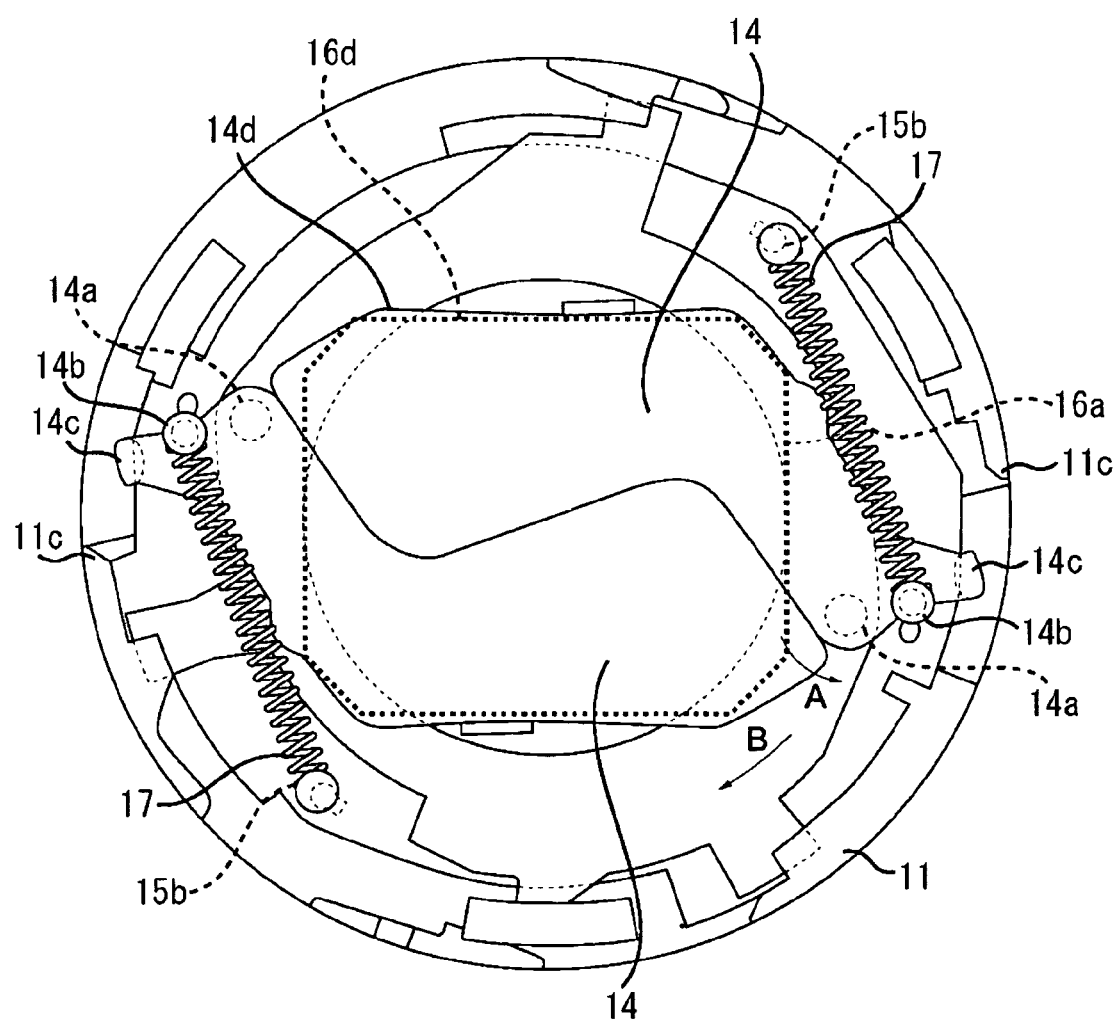
FIG. 5 is a front elevational view illustrating a state where the barrier blades are fully closed when the lens barrel member reaches a retraction end in the lens barrel with the barrier device according to an exemplary embodiment of the present invention.

In the barrier open state, in which the barrier blades 14 have fully opened, the barrier blades 14 retract to outside the photographing opening portion 16a as indicated by dashed lines in FIG. 2, and the photographing opening portion 16a is in a fully open state. Further, as illustrated in FIG. 2 and FIG. 5, the barrier blades 14 are formed such that the amount of overlap between the cover member 16 and the barrier blades 14 with respect to a direction orthogonal to the optical axis and orthogonal to a longer side of the photographing opening portion 16a becomes smallest in the midsection of the longer side of the photographing opening portion 16a.

At the end faces 14d of the barrier blades 14, there remain gate traces 14e produced when the barrier blades 14 are subjected to a plastic molding. Also, in the lens barrel member 11, positioning shape portions 11b for the lens barrel member 11 and the cover member 16 are formed. Thus, in the barrier blades 14, in unused regions surrounded by the end faces 14d of the barrier blades 14 and portions of the outside diameter side of the lens barrel member 11 (the outside diameter of the lens barrel), there are provided the open stoppers 11a, the gate traces 14e, and the positioning shape portions 11b for the cover member 16.

In the barrier open state of the barrier blades 14, the rotation shafts 14a, which are positioned closer to the optical axis than the spring hooked portions 14b, are in a state of being able to freely move in a circumferential direction around the optical axis in association with a rotation of the barrier driving member 15.

Therefore, the barrier blades 14 are in a state that they have received an urging force for rotating in the clockwise direction by a tension of the barrier driving springs 17 around the hook-shaped portions 14c extended outwardly to face toward the lens barrel member side in the base end portions of the barrier blades 14.

Next, the case where the lens barrel member 11 begins to retract and the barrier blades 14 reach a state in progress of making transitions from the barrier open state to the closed state (hereinafter referred to as an intermediate state) will be described with reference to FIG. 3.

Figure 3:
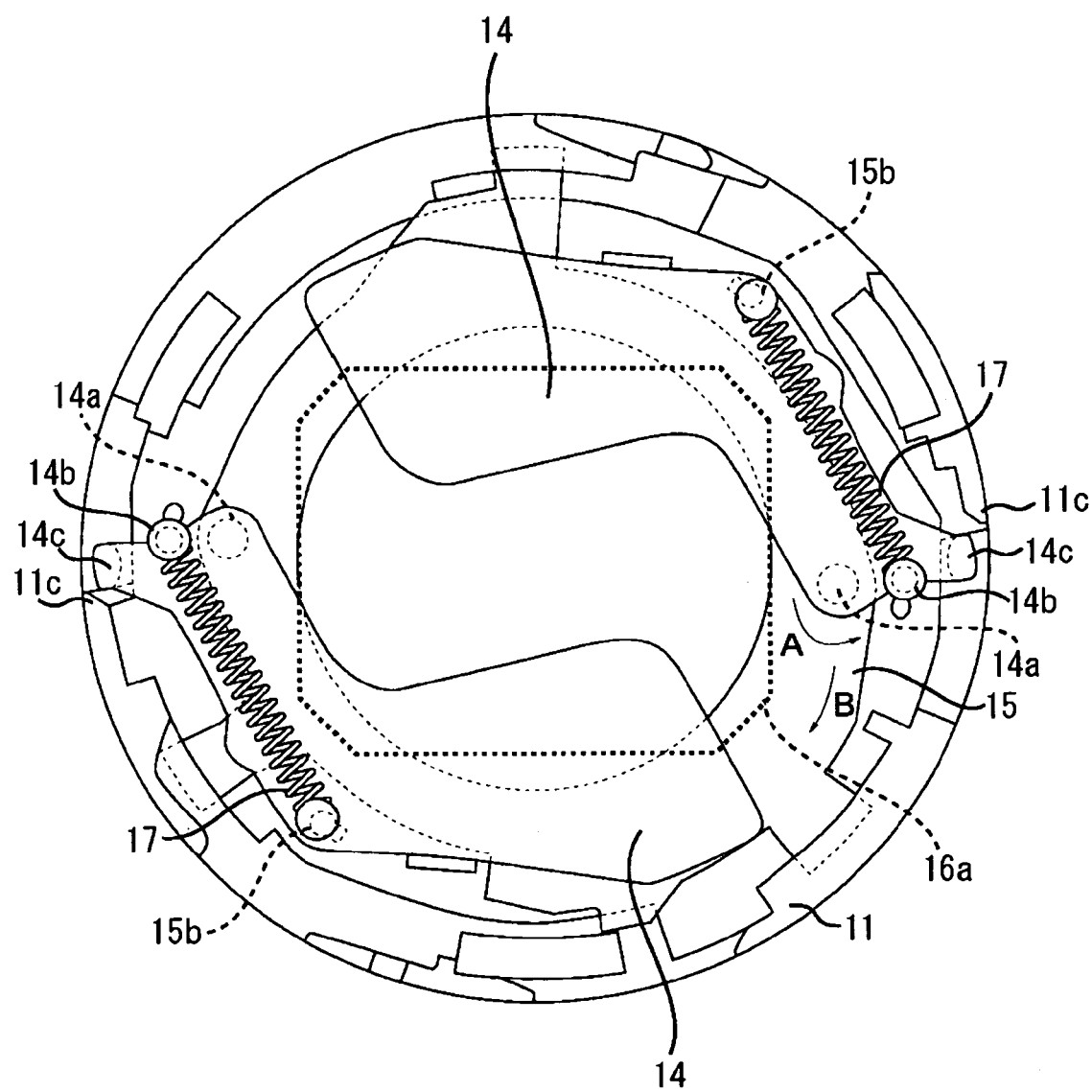
FIG. 3 is a front elevational view illustrating a state where the lens barrel member is retracted and the barrier blades are in a transition process from an open state to a closed state in the lens barrel with the barrier device according to an exemplary embodiment of the present invention.

FIG. 3 is an elevational view illustrated a state where the lens barrel member 11 retracts and the barrier blades are in the progress of making transitions from the open state to the closed state (the intermediate state) in the lens barrel with a barrier device according to an exemplary embodiment of the present invention.

In the intermediate state, where the barrier blades 14 make transitions, the barrier driving member 15 and the rectilinear motion tube 13 are in a state of making relative movement in an approaching direction compared with when the lens barrel member 11 extends outward. Therefore, in the intermediate state, the cam face 13a of the rectilinear motion tube 13 and the cam face 15a of the barrier driving member 15 are in contact with each other. Accordingly, the barrier driving member 15 is forcibly rotated in the clockwise direction, as viewed in FIG. 3, against an urging force of the barrier driving springs 17 by the action of the cam faces. Then, the barrier blades 14 move in the clockwise direction around the optical axis following a rotation of the barrier driving member 15 in the clockwise direction.

On the other hand, the barrier blades 14 perform a rotational motion in the counterclockwise direction in a state in which the lens barrel hooked portions 14c are pressed tightly against the operation projection portions 11c of the lens barrel member 11, while receiving an urging force of the barrier driving springs 17 and rotating around the rotation shafts 14a. Thus, the barrier blades 14 rotate in the counterclockwise direction around the rotation shafts 14a while revolving in the clockwise direction around the optical axis.

At this time, the barrier blades 14 are in a state of rotating in the counterclockwise direction around the rotation shaft 14a. As a result, the barrier driving springs 17 are expanded longer than that in the barrier open state, and, therefore, the amount of charge of energy due to an elastic deformation of the barrier driving springs 17 is increased.

Next, the case where the lens barrel member 11 further retracts and the barrier blades 14 have reached a state of being located at an intermediate position (hereinafter referred to as a fitted state) where two barrier blades 14 are fitted together from the intermediate state will be described with reference to FIG. 4.

Figure 4:
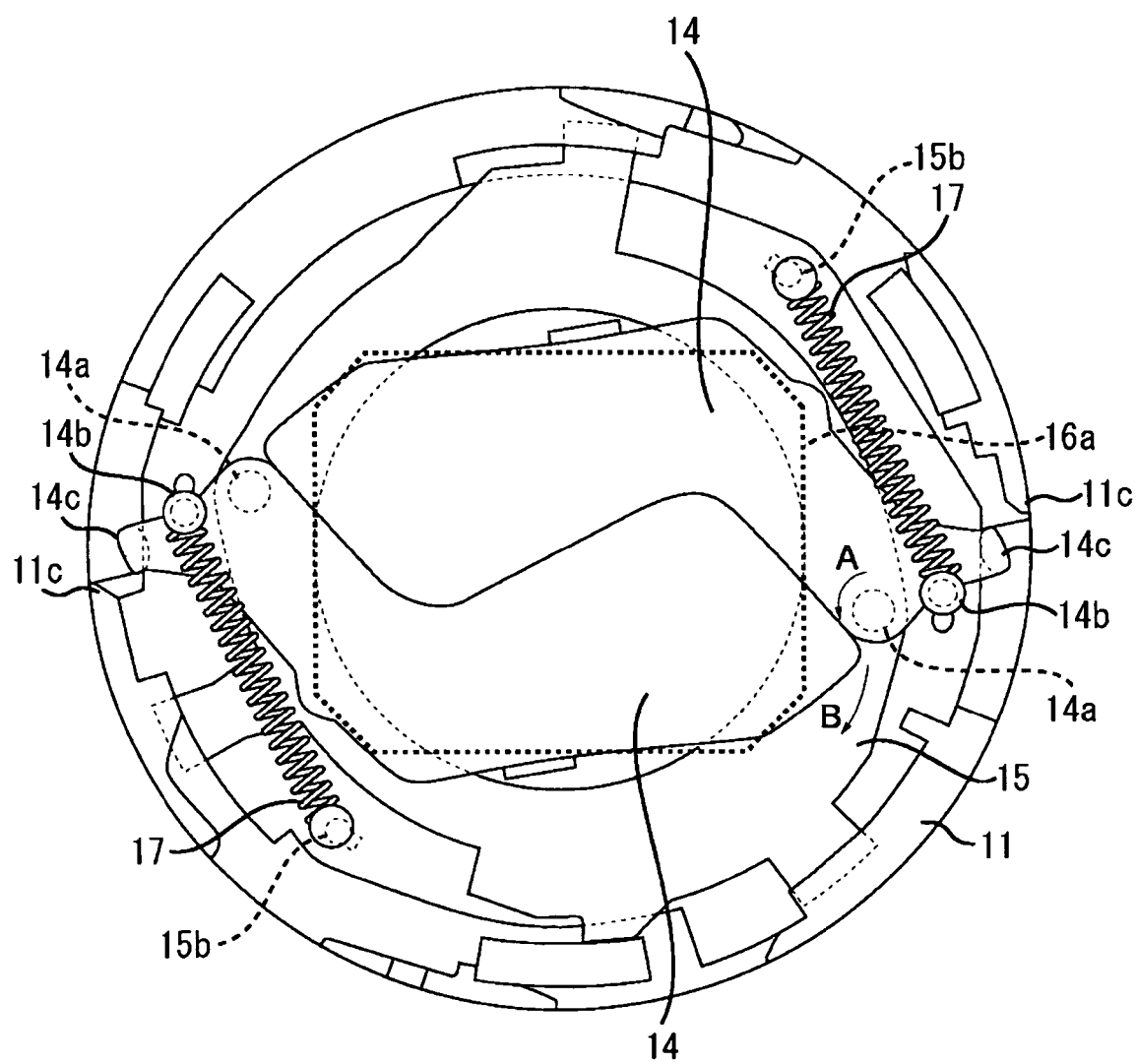
FIG. 4 is a front elevational view illustrating a state where two barrier blades are fitted together when a retraction of the lens barrel member has further progressed in the lens barrel with the barrier device according to an exemplary embodiment of the present invention.

FIG. 4 is an elevational view illustrating a state where two barrier blades 14 are fitted together (the fitted state) when a retraction of the lens barrel member 11 progresses further in the lens barrel with a barrier device according to an exemplary embodiment of the present invention. In the fitted state, the barrier driving member 15 has rotated further in the clockwise direction, thereby leading to a state where two barrier blades 14 come into contact with each other and the vicinity of the center of the photographing opening portion 16a (a part of the opening portion 16a including the optical axis) is shielded.

In the fitted state, portions of outer sides near the free end portions of the barrier blades 14 (portions of the barrier blades 14 that are located closest to the outside diameter when the barrier blades 14 are fully opened) enter into the inside of the photographing opening portion 16a. Accordingly, a gap is made at corners of the photographing opening portion 16a. The outer sides near the free end portions which enter into the inside of the opening portion 16a in the barrier blades 14 are portions located close to the outermost periphery of the lens barrel member 11 in the barrier open state, which thus constitutes a portion that substantially determines the diameter of the barrier device. In the case of a conventional barrier device in which the rotation shafts of the barrier blades are mounted on the lens barrel member, the fitted state corresponds to the barrier closed state.

Next, the case where the lens barrel member 11 reaches a retraction end, thus leading to a barrier fully-closed state (hereinafter referred to as a closed state) will be described with reference to FIG. 5.

FIG. 5 is an elevational view illustrating a barrier fully-closed state (the closed state) when the lens barrel member 11 reaches the retraction end in the lens barrel with a barrier device according to an exemplary embodiment of the present invention. When the barrier blades 14 are in the closed state, the barrier driving member 15 is positioned in the "closed phase" where the barrier driving member 15 has rotated furthest in the clockwise direction.

In the state illustrated in FIG. 5, the hook-shaped portions 14c of the barrier blades 14 are away from the operation projection portions 11c of the lens barrel member 11, so that the barrier blades 14 are freely rotatable around the rotation shafts 14a.

When the barrier blades 14 are in the closed state, the pair of barrier blades 14 is urged to rotate in the counterclockwise direction as viewed in FIG. 5 around the rotation shafts 14a by tensions of the barrier driving springs 17. Thus, the pair of barrier blades 14 is pressed tightly against each other, thus maintaining the fitted state.

In addition, the barrier blades 14 revolve in the clockwise direction around the optical axis integrally with the barrier driving member 15 in the process of moving from the fitted state to the closed state. As a result, gaps made at corner regions of the photographing opening portion 16a are completely shielded by the barrier blades 14.

Thus, in the closed state, in which the pair of barrier blades 14 is fitted together, a shielded area is formed in a shape geometrically similar to the photographing opening portion 16a, which is one size larger than an opening in substantially rectangular shape in the photographing opening portion 16a. The shielded area is formed by the pair of barrier blades 14 fitted together as illustrated in FIG. 4. The shielded area is diagonally laid on an opening shape of the photographing opening portion 16a. From this state, the pair of barrier blades 14 revolves integrally with the barrier driving member 15. As a result, the opening shape of the photographing opening portion 16a and the shielded area formed by the pair of barrier blades 14 fitted together conform closely to each other in a state of no relative rotation, which shift to the closed state as illustrated in FIG. 5, then leading to the shielded state.

In addition, when shifting from the fitted state to the closed state, the barrier blades 14 revolve in the clockwise direction around the optical axis. Accordingly, the barrier driving springs 17 elastically deform to further expand, and the amount of charge, i.e., an accumulation of elastic energy, increases.

The lens barrel with a barrier device according to the present exemplary embodiment as described above is directed to achieving a reduction in size of the outside diameter of the lens barrel member 11. For this purpose, it is effective to make a space between the photographing opening portion 16a of the barrier cover (cover member) 16 and the inner circumferential surface of the lens barrel member 11 as narrow as possible.

Accordingly, in the lens barrel with a barrier device, the size of the barrier blades 14 is reduced by bringing the size of a shielded area formed by the pair of barrier blades 14 fitted together as close as possible to an opening shape of the photographing opening portion 16a. In addition, the lens barrel with a barrier device is configured to accommodate the pair of barrier blades 14, which has been reduced in size, in a compact manner with no clearances within a space between the photographing opening portion 16a of the barrier cover 16 and the inner circumferential surface of the lens barrel member 11.

For this reason, in the lens barrel with a barrier device, as illustrated in FIG. 2, the size of a shielded area formed by the pair of barrier blades 14 fitted together is set at the minimum necessary size, namely, one size larger than that of the photographing opening portion 16a. Thus, in the barrier device, the barrier blades can be reduced in size within the range in which a shielded area formed by the pair of barrier blades 14 fitted together corresponds to the photographing opening portion 16a in a shielding manner.

The barrier blades 14, which have been reduced in size, are mounted within the lens barrel member 11 in such a manner that respective sides mutually aligned are positioned along the sides of the periphery of the photographing opening portion 16a, and outer sides of the barrier blades 14 are housed within the lens barrel member 11 in such a state as adjoining to the inner circumferential surface of the lens barrel member 11.

In the barrier device configured in this manner, as illustrated in FIG. 4, the arrangement position of a shielded area formed when rotating and closing the pair of barrier blades 14 around the rotation shafts 14a is displaced diagonally relative to the arrangement position of the photographing opening portion 16a. Therefore, in the barrier device, when rotating and closing the pair of barrier blades 14 around the rotation shafts 14a, gaps are made between the photographing opening portion 16a and the barrier blades 14.

Thus, in the barrier device, the pair of barrier blades 14 and the barrier driving member 15 are rotationally adjusted together around the optical axis to arrange a shielded area formed by the pair of barrier blades 14 in overlapping position upon the photographing opening portion 16a. Therefore, the photographing opening portion 16a is shielded.

As a consequence, in the barrier device, the entire configuration can be reduced in size, compared with a conventional barrier device that has large barrier blades enough to shield without making a gap between the photographing opening portion 16a and the barrier blades when the pair of barrier blades is rotated around the rotation shafts 14a to close.

In the barrier device, the size of the photographing opening portion 16a can be wider than that of a barrier device in a conventional configuration. In other words, the outside diameter of the lens barrel member 11 can be configured smaller than that of a conventional one, relative to the photographing opening portion 16a with the same size as that of the conventional one.

Further, in the lens barrel with a barrier device according to the present exemplary embodiment as described above, the barrier blades 14 are pivotally supported by the barrier driving member 15 and rotates integrally with the barrier driving member 15. Thus, if the phase of the barrier driving member 15 in the barrier closed state varies according to individual differences or the like, positions of the barrier blades 14 may deviate in a rotational direction, and corner regions of the opening portion 16a may be exposed.

In the barrier device according to the present exemplary embodiment, the end face 14d, which can cover a portion of the longer side 16d of the photographing opening portion 16a, of the barrier blades 14 is formed in a warped shape like pincushion. Therefore, the barrier blades 14 are configured to have a somewhat great amount of overlap with the photographing opening portion 16a when the barrier blades 14 shield the corner regions of the photographing opening portion 16a.

Accordingly, even if the phase of the barrier driving member 15 deviates in a rotational direction during a retraction, the barrier blades 14 can reliably shield the photographing opening portion 16a.

Further, in the configuration of the barrier blades 14, void spaces are generated between recesses near the center of the end faces 14d of the barrier blades 14 and an inner circumferential surface of the lens barrel member 11 in the barrier open state. The recesses near the center are introduced by forming the end faces 14d of the barrier blades 14 in a warped shape like pincushion. Then, in the barrier blades 14, the barrier open stoppers 11a usable during the barrier open state, the positioning shape portions 11b for the cover member 16, and the gate traces 14e produced when the barrier blades 14 are subjected to a plastic molding are provided in the recesses near the center thereof. Thus, in the barrier device, void spaces can be effectively used, and a further reduction in size of the lens barrel member 11 can be achieved.

Next, the case where the barrier blades 14 are in a forcibly opened state (hereinafter referred to as a forced open state) when the lens barrel member 11 is retracted and the barrier blades 14 are closed will be described with reference to FIG. 6.

Figure 6:
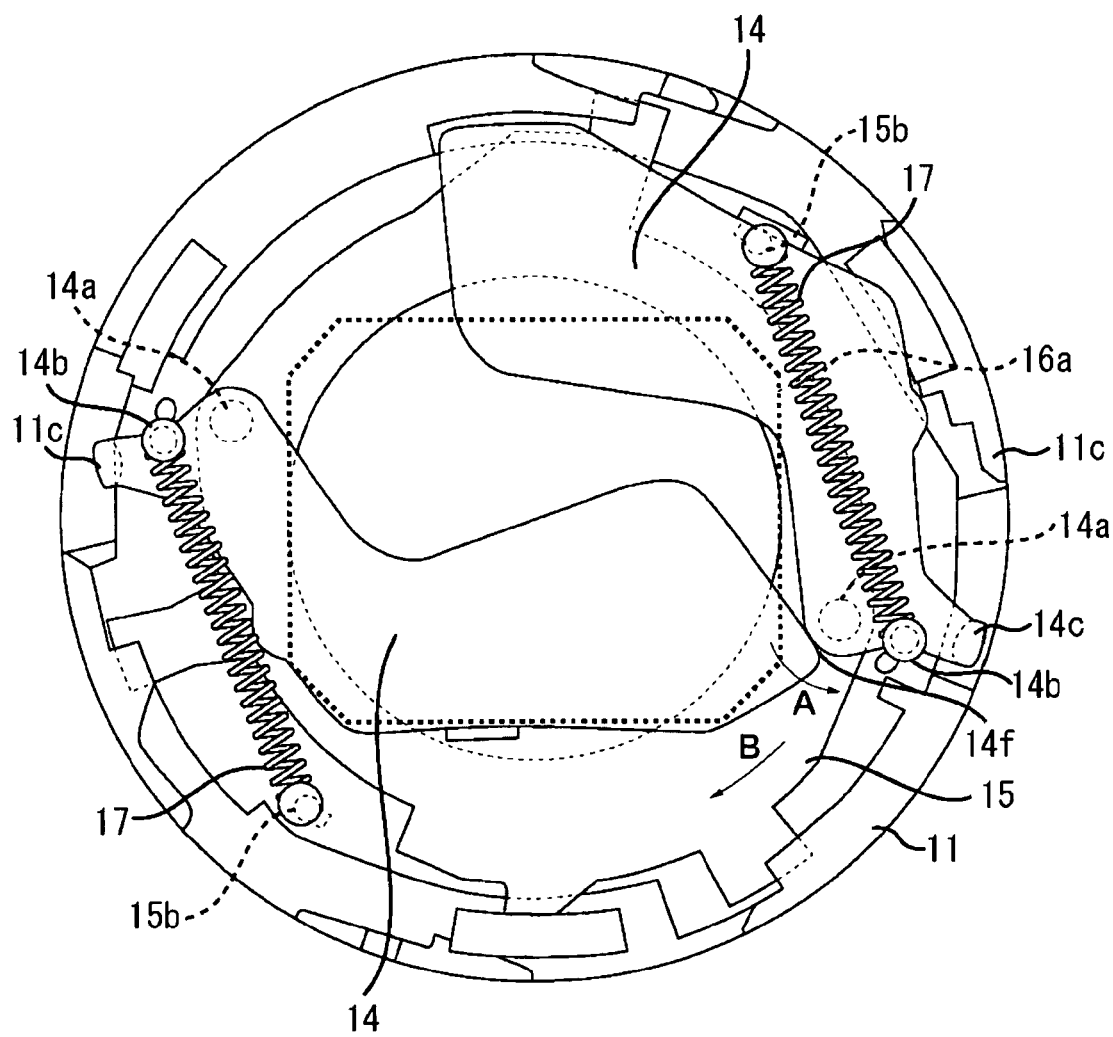
FIG. 6 is a front elevational view illustrating a state where the barrier blades are forcibly opened during a retraction when the barrier blades shield a barrier opening portion in the lens barrel with the barrier device according to an exemplary embodiment of the present invention.

FIG. 6 is a front elevational view illustrating a state in which the barrier blades 14 are forcibly opened during the retraction while the barrier blades 14 shield the photographing opening portion 16a in the lens barrel with a barrier device according to an exemplary embodiment of the present invention.

When the barrier blades 14 are moved to be forcibly opened during the closed state, the barrier blades 14 rotate in the clockwise direction around the rotation shafts 14a. Consequently, an opening operation of the barrier blades 14 causes the barrier driving springs 17 to be elastically deformed to be expanded and charged.

When an action to forcibly open the barrier blades 14 is cancelled, the barrier blades 14 return to a normal closed position while releasing charging of an elastic energy accumulated in the barrier driving springs 17.

Therefore, in the barrier device according to the present exemplary embodiment, when the barrier blades 14 are forcibly opened, the barrier driving springs 17 act as a spring for absorbing a force. Consequently, mechanical failures can be prevented or reduced.

Also, in the barrier device according to the present exemplary embodiment, foreign substance such as sand may adhere to the barrier blades 14 or the barrier driving member 15 in a state where the lens barrel member 11 extends outwardly and the barrier blades 14 are opened. In such a case, the barrier device is in a state where a closing operation of the barrier blades 14 is hindered during the retraction of the lens barrel, similar to the manner as illustrated in FIG. 6. The barrier driving springs 17 act to absorb force, so that mechanical failures of a driving mechanism of the barrier blades 14 can be prevented or reduced.

In the case of a conventional configuration for opening and closing the barrier blades in linkage to a cam mechanism, a force to forcibly open the barrier blades is restrained by a portion at which a follower pin and a cam groove engage with each other, so that undue force may act on a mechanism section. For this reason, if the barrier blades are configured to perform opening and closing operations with the cam mechanism, a force to forcibly open the barrier blades cannot be absorbed, and members may be subjected to plastic deformation, thus causing mechanical failures.

Next, description will be given with respect to a configuration for further reducing the outside diameter of the lens barrel member 11 in the barrier device according to the present exemplary embodiment.

A conventional barrier device is configured such that the barrier blades are pressed down by a cover member to prevent detachment. When the barrier blades further enter the inside of the opening portion beyond a normal closing position, the barrier blades may detach from the barrier cover, thus dropping from the opening portion.

In the conventional barrier device, in order to prevent this drawback, a closing stopper is provided in the barrier cover, the lens barrel member, or the barrier driving member. However, with such a configuration, if the barrier blades contact the closing stopper before the barrier blades are fitted together with a normal barrier closing operation, the barrier blades may not close completely. Therefore, it is necessary to provide a clearance for absorbing errors between the barrier blades and the closing stopper.

It is necessary to take a clearance for absorbing errors in larger amounts, as the number of parts intervened between the barrier blades and the closing stopper increases and an assembly error increases. Further, in view of the principle of lever ratio, the amount of a rotation allowance of the barrier blades by a clearance for absorbing errors must be widened in proportion to a closeness of the position of the closing stopper to the rotation shafts of the barrier blades.

Further, the amount of overlap between the barrier blades and the barrier cover in the barrier closed state is set to be equal to or greater than a sum amount obtained by adding the amount of allowance for rotational movement of the barrier blades caused by a clearance between the closing stopper and the barrier blades to the amount of hooking for preventing the barrier blades from dropping.

Therefore, in the conventional barrier device, the amount of overlap between the barrier blades and the barrier cover in the barrier closed state must be increased, thus leading to an increase in size.

In the barrier device according to the present exemplary embodiment, a stopper portion 14$f$ near the rotation shaft 14$a$ of the other barrier blade 14 is used as a closing stopper for one barrier blade 14. The stopper portion 14$f$ is formed in an arc shape having its center of curvature at the rotation shaft 14$a$. The barrier device, as illustrated in FIG. 6, is configured such that a free end portion of one barrier blade 14 contact the stopper portion 14$f$ of the other barrier blade 14 to restrain rotation of one barrier blade 14.

In the barrier device configured in the above-described manner, the barrier blades 14 coming in contact with each other in the closed state act as a closing stopper during the forced open state.

In the barrier device configured in the above-described manner, only the barrier driving member 15 is intervened between one barrier blade 14 that tends to enter the inside of the photographing opening portion 16$a$ and the other barrier blade 14 that is provided with the stopper portion 14$f$ as a closing stopper.

Further, since the most leading end of the barrier blade 14 that tends to enter the inside of the opening potion 16$a$ contacts the stopper portion 14$f$, the amount of rotation allowance of the barrier blades 14 caused by a clearance between the barrier blades 14 and the stopper portion 14$f$ becomes minimal.

Therefore, a positional precision of the barrier blades 14 in the barrier closed state can be enhanced. Accordingly, the size of the barrier blades 14 can be reduced and, thus, the size of the barrier device can be reduced by setting the amount of overlap between the cover member 16 and the barrier blades 14 for absorbing a positional precision of the barrier blades 14 at a small value. Further, the ratio of the size of the photographing opening portion 16$a$ to the outside diameter of the lens barrel member 11 can be set to a larger value than in the conventional barrier device, by reducing the size of the barrier blades 14 relative to a predetermined size of the photographing opening portion 16$a$. Thus, the outside diameter of the lens barrel member 11 relative to the size of the photographing opening portion 16$a$ can be further reduced than in the conventional barrier device.

Next, description will be given with reference to FIG. 7, with respect to a configuration for urging the barrier blades in a closing direction during retraction of the lens barrel and urging the barrier blades in an opening direction during outward extension of the lens barrel by the barrier driving springs, thus leading to a reduction in the number of parts in the barrier device according to the present exemplary embodiment.

Figure 7:
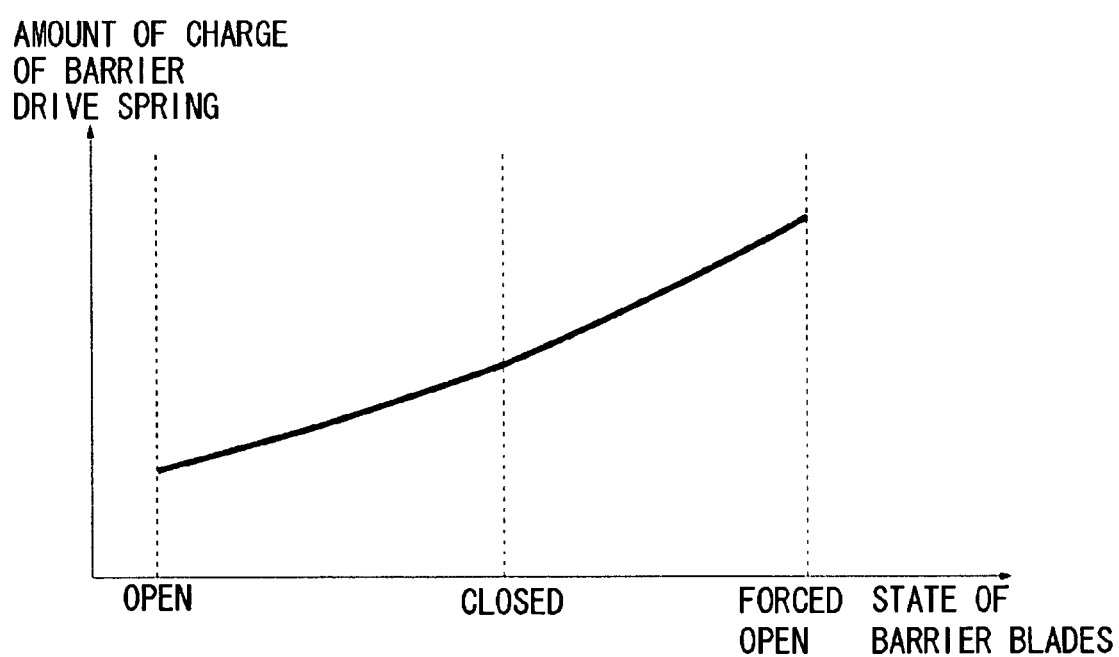
FIG. 7 is a graph illustrating a relationship between the amount of charge of a barrier driving spring and the state of the barrier blades in the lens barrel with the barrier device according to an exemplary embodiment of the present invention.

FIG. 7 is a graph illustrating a relationship between the amount of charge of the barrier driving spring 17 and the state of the barrier blades 14 in the lens barrel with a barrier device according to an exemplary embodiment of the present invention. As described above, the amount of charge of the barrier driving springs 17 satisfies the following relationship:

(forced open state)>(closed state)>(open state).

An urging force of a spring acts in a direction to decrease the amount of charge (amount of elastic deformation) of the spring. Thus, in a state where the lens barrel member 11 has retracted and the barrier driving member 15 has rotated to the barrier closed phase, an urging force in a closing direction acts on the barrier blades 14. Further, in a state where the lens barrel member 11 has extended outward and a restraining action to a rotational direction of the barrier driving member 15 has been released, an urging force in an opening direction acts on the barrier blades 14.

In addition, in the barrier device, the barrier blades 14 operate upon receiving an opening force obtained by releasing a charge accumulated in the barrier driving springs 17. Therefore, if there is a phase that the amount of charge of the barrier driving springs 17 increases in the process of opening of the barrier blades 14, then in this phase, the barrier blades 14 may become unable to receive an opening force.

Accordingly, in order for the barrier blades 14 to be smoothly opened by an urging force of the barrier driving springs 17, it becomes necessary for the amount of charge of the barrier driving springs 17 to monotonically decrease as the barrier blades 14 are opened.

In addition, the lens barrel member 11 may be retracted while restraining the barrier blades 14 from closing, and then the restraint of the barrier blades 14 may be released after the lens barrel has been retracted. In this case, the amount of charge of the barrier driving springs 17 needs to monotonically decrease as the barrier blades 14 close.

In a configuration of the barrier device, as illustrated in FIG. 7, the amount of charge of the barrier driving springs 17 varies in such a way as to monotonically increase as the state of the barrier blades 14 shifts from an opening operation of the barrier blades 14 to a closing operation of the barrier blades 14 and, then, to a forced opening operation of the barrier blades 14.

As a consequence, in the barrier device configured in the above-described manner, the barrier blades 14 can be urged in a closing direction during retraction of the lens barrel and urged in an opening direction during outward extension of the lens barrel by the same barrier driving springs 17. For this reason, the number of parts can be decreased compared with a conventional barrier device equipped with a spring dedicated for closing and a spring dedicated for opening.

As described above, the lens barrel with a barrier device according to the present exemplary embodiment is configured such that the barrier driving member 15 is mounted on the lens barrel member 11 to be rotatable around the optical axis, and the barrier blades 14 are pivotally mounted on the barrier driving member 15.

The open/close operation of the barrier blades 14 is performed in combination of a revolving operation of the barrier blades 14 and two different rotating operations of the barrier blades 14. The revolving operation of the barrier blades 14 is an operation in which the barrier blades 14 rotate around the optical axis integrally with the barrier driving member 15. A first rotating operation of the barrier blades 14 is an operation in which the barrier blades 14 rotate around the rotation shafts 14a. A second rotating operation of the barrier blades 14 is an operation in which the barrier blades 14 rotate around the hook-shaped portions 14c, which are caught by the operation projection portions 11c of the lens barrel member 11.

In the barrier device according to the present exemplary embodiment, the amount of rotation of the barrier driving member 15 and the respective amounts of rotation of the barrier blades 14 can be set to appropriate values.

As a result, the barrier device can be configured to compactly accommodate the barrier blades 14 in an open state by efficiently utilizing a space between the photographing opening portion 16a and the lens barrel member 11. Therefore, the outside diameter of the lens barrel member 11 relative to the size of the photographing opening portion 16a can be minimized.

Further, the barrier device according to the present exemplary embodiment is configured such that the barrier driving springs 17 can also act as an energy absorbing mechanism for preventing external forces from acting unduly during the forced opening operation. Consequently, failures of the barrier device during the forced opening operation can be prevented or reduced.

In addition, the same barrier driving springs 17 perform both closing and opening operations, which are effective in reducing the number of parts compared with a conventional barrier device provided with a spring dedicated for closing and a spring dedicated for opening. Further, the barrier blades 14 are provided with a shape for absorbing a phase displacement of the barrier driving member 15 in the closed state. As a result, this provision is effective in preventing manufacturing errors of parts from causing a gap when the photographing opening portion 16a is shielded. Additionally, in the barrier device, the outside diameter of the lens barrel member 11 can be further reduced by reducing the amount of overlap between the barrier blades 14 and the barrier cover 16.

Furthermore, a space can be effectively utilized and the size of the lens barrel member 11 can be further reduced by locating the open stopper 11a in a region surrounded by the barrier blades 14 and the lens barrel member 11 when the barrier blades 14 are opened.

While the present invention has been described with reference to the exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-113865 filed Apr. 24, 2008, which is hereby incorporated by reference herein in its entirety.

What is claimed is:

1. A lens barrel comprising:
   a lens barrel member including an optical system; and
   a barrier device mounted on the lens barrel member, the barrier device comprising,
      a plurality of barrier blades that are openable and closable to protect a front surface of the optical system;
      a cover member mounted on the lens barrel member and having an opening portion for allowing light to pass therethrough; and
      a barrier driving member mounted on the lens barrel member and configured to drive the plurality of barrier blades such that the plurality of barrier blades are revolvable around an optical axis,
   wherein a size of a shielded area defined when the plurality of barrier blades are fitted together after rotating corresponds to a range capable of shielding the opening portion,
   wherein rotation shafts configured to allow the plurality of barrier blades to rotate therearound to be opened and closed are pivotally mounted on the barrier driving member, and
   wherein the barrier driving member is configured to rotate to bring the plurality of barrier blades into a closed state in such a manner as to shield a gap made between the shielded area and the opening portion.

2. The lens barrel according to claim 1, wherein, when the plurality of barrier blades are in an open state, the plurality of barrier blades are accommodated within a space made between a periphery of the opening portion of the cover member and an inner peripheral side of the lens barrel member.

3. The lens barrel according to claim 1, wherein, when the barrier driving member moves to an intermediate position between open and closed positions, the plurality of barrier blades are fitted together to shield a portion including the optical axis of the opening portion, and when the barrier driving member moves to the closed position, the plurality of barrier blades rotate around the optical axis integrally with the barrier driving member to completely shielding the opening portion.

4. The lens barrel according to claim 1, wherein, when the barrier driving member moves to an intermediate position between open and closed positions, a portion of the plurality of barrier blades, which is located closest to an outside diameter when the plurality of barrier blades are fully opened, enters inside of the opening portion, making gaps at corners of the opening portion.

5. The lens barrel according to claim 1, wherein, when the plurality of barrier blades are in a closed state, an amount of overlap between the cover member and the plurality of barrier blades, in longer sides of the opening portion, in a direction orthogonal to the optical axis and orthogonal to the longer sides of the opening portion, becomes minimal at midsections in the longer sides of the opening portion.

6. The lens barrel according to claim 1, wherein, when the plurality of barrier blades are in an open state, open stoppers configured to determine open positions of the plurality of barrier blades are located in regions surrounded by the plurality of barrier blade and an outside diameter the lens barrel member.

7. The lens barrel according to claim 1, wherein, when the plurality of barrier blades are in an open state, positioning shape portions for the lens barrel member and the cover member are located in regions surrounded by the plurality of barrier blades and an outside diameter of the lens barrel member.

8. The lens barrel according to claim 1, wherein, when the plurality of barrier blades are in an open state, gate traces produced during a plastic molding operation are located in regions surrounded by the plurality of barrier blades and an outside diameter of the lens barrel member.

9. A lens barrel comprising:
- a lens barrel member including an optical system;
- a barrier device mounted on the lens barrel member, the barrier device including a plurality of barrier blades that are openable and closable to protect a front surface of the optical system;
- a barrier driving member mounted on the lens barrel member and configured to drive the plurality of barrier blades such that the plurality of barrier blades are revolvable around an optical axis;
- rotation shafts pivotally mounted on the barrier driving member at positions close to the optical axis in base end portions of the plurality of barrier blades to allow the plurality of barrier blades to rotate to be openable and closable;
- hook-shaped portions extended outward to face toward the lens barrel member side farther than the rotation shafts relative to the optical axis, in the base end portions of the plurality of barrier blades;
- spring hooked portions arranged at positions between the rotation shafts and the hook-shaped portions in the base end portions of the plurality of barrier blades;
- operation projection portions arranged at the lens barrel member side in such a manner as to be able to contact the hook-shaped portions;
- barrier driving springs mounted between the spring hooked portions of the barrier blades and the lens barrel member and configured to urge the plurality of barrier blades in a direction to cause the spring hooked portions to approach the operation projection portions; and
- a driving unit configured to rotate the barrier driving member, wherein, when the driving unit rotates the barrier driving member to cause the hook-shaped portions to move away from the operation projection portions, the plurality of barrier blades rotate around the rotation shafts by an urging force of the barrier driving springs and then close, and wherein, when the hook-shaped portions are caused to contact the operation projection portions by an urging force of the barrier driving springs while the barrier driving member is rotated, the plurality of barrier blades rotate around the spring hooked portions and then open.

* * * * *